United States Patent [19]

Kago et al.

[11] Patent Number: 4,580,250
[45] Date of Patent: Apr. 1, 1986

[54] ULTRASONIC DETECTION AND COMMUNICATION SYSTEM FOR AUTOMOBILES

[75] Inventors: Yoshiyuki Kago, Aichi; Shigeyuki Akita, Okazaki; Koichi Mizuno, Toyota, all of Japan

[73] Assignee: Nippon Soken, Inc., Nishio, Japan

[21] Appl. No.: 517,455

[22] Filed: Jul. 26, 1983

[30] Foreign Application Priority Data

Jul. 31, 1982 [JP] Japan ................... 57-134305

[51] Int. Cl.⁴ .............................. G01S 15/93
[52] U.S. Cl. ..................... 367/112; 340/904; 367/111; 367/909
[58] Field of Search ............... 340/901, 902, 903, 904; 367/99, 111, 112, 116, 909

[56] References Cited

U.S. PATENT DOCUMENTS

3,231,852  1/1966  Kritz ..................... 367/909 X
4,490,716  12/1984  Tsuda et al. ................ 340/904

Primary Examiner—Richard A. Farley
Attorney, Agent, or Firm—Cushman, Darby & Cushman

[57] ABSTRACT

An ultrasonic detection circuit for detecting obstacles behind a backing motor vehicle, and an ultrasonic communication circuit are automatically switched such that the ultrasonic detection circuit is operable only when the communication circuit is not in use. Furthermore, the ultrasonic detection circuit may be operated only when the motor vehicle is in one or more particular operating conditions. The system comprises a rear ultrasonic transducer used for both the detection circuit and for the communication circuit so that detection of obstacles behind the vehicle and communication with another motor vehicle behind the vehicle are possible, and a front ultrasonic transducer used for only the communication circuit so that communication with another motor vehicle ahead of the vehicle is also possible. The rear and front transducers are directly connected to a call signal responding circuit of the communication circuit so that the call signal responding circuit is capable of responding to a call signal from a vehicle ahead of or behind the vehicle.

14 Claims, 7 Drawing Figures

ULTRASONIC DETECTION AND COMMUNICATION SYSTEM FOR AUTOMOBILES

BACKGROUND OF THE INVENTION

This invention relates to a communication system and a detection system for automobiles, and particularly, the instant invention relates to an ultrasonic system capable of functioning as a detection for detecting obstacles behind a motor vehicle, and as a transceiver for communication between motor vehicles.

Ultrasonic detection systems for motor vehicles operate as detecting apparatus by receiving a reflected echo signal of ultrasonic waves from one or more obstacles. Conventional ultrasonic detection systems used for detecting obstacles around a moving motor vehicle, however, comprise one or more ultrasonic transducers and an ultrasonic wave producing-receiving-processing circuit which are exclusively used for the detection system.

On the other hand, conventional communication systems, such as tranceivers or automobile telephones, include a radio wave transmitter and a receiver. Namely, conventional communication system for automobiles employ electromagnetic waves or radio waves as the carrier. However, when it is intended to communicate with occupants of motor vehicles nearly, ultrasonic waves may be used as the carrier since a long transmission distance is unnecessary.

When it is intended to mount a detection system and a communication system on a motor vehicle by applying conventional techniques, two different apparatuses have to be separately mounted. Since ultrasonic waves may be used as the carrier signal for vocal communication, an ultrasonic tranceiver may be mounted on a motor vehicle in addition to an ultrasonic obstacle detecting apparatus in such a manner that an ultrasonic transducer is used in common to both systems. However, these two different ultrasonic systems cannot be simply combined to use the same transducer in common because ultrasonic waves from one system may interfere with the other system.

SUMMARY OF THE INVENTION

It is, therefore, an object of the present invention to provide a new and useful ultrasonic system for a motor vehicle, which system can be used as a detection device and a communication apparatus without suffering from interference.

According to a feature of the present invention an ultrasonic detection system or obstacle detecting circuit and an ultrasonic communication circuit are employed in such a manner that the obstacle detecting circuit is coupled to an ultrasonic transducer mounted at the rear of a motor vehicle and the communication circuit is coupled to the rear transducer and also to another ultrasonic transducer mounted at the front of the motor vehicle. The communication circuit is operable all the time, while the obstacle detecting circuit is operable only when the communication circuit is not in use. Furthermore, the obstacle detecting circuit may be operable only when the motor vehicle is in a particular condition or conditions.

In order for the rear ultrasonic transducer to be used in common with the obstacle detecting circuit and the communication circuit, the frequency of the ultrasonic waves used in both circuits is made identical. Since such an identical ultrasonic wave frequency may result in interference between the obstacle detecting circuit and the communication circuit, the obstacle detecting circuit is disabled when the communication circuit is in use. Furthermore, a filter circuit is employed in the communication circuit so as to distinguish carrier signals from other vehicles from echo signals.

BRIEF DESCRIPTION OF THE DRAWINGS

The objects and features of the present invention will become more readily apparent from the following detailed description of the preferred embodiments taken in conjunction with the accompanying drawings in which.

The same or corresponding elements and parts are designated by like reference numerals throughout the drawings.

DETAILED DESCRIPTION OF THE INVENTION

Figure 1:
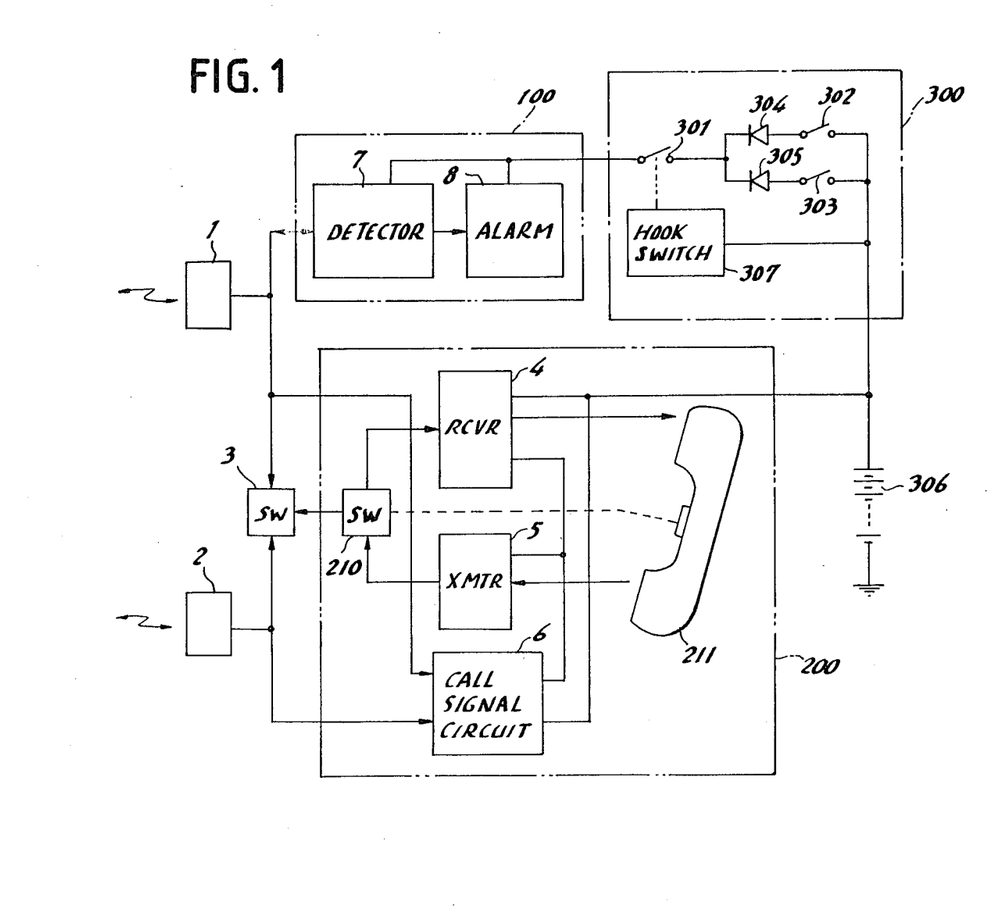
FIG. 1 is schematic block diagram of an embodiment of the ultrasonic system according to the present invention.

Referring now to FIG. 1, a schematic block diagram of an embodiment of the ultrasonic system according to the present invention is shown. The ultrasonic system generally comprises first and second ultrasonic transducers 1 and 2 which are respectively mounted at the rear and the front of a motor vehicle (not shown), an obstacle detecting circuit 100, a communication circuit 200, and a switching circuit 300. The ultrasonic transducers 1 and 2, which are respectively referred to as a rear transducer 1 and a front transducer 2 hereafter, are used to transmit and receive ultrasonic wave signals so that vocal communication between motor vehicles is effected. The rear ultrasonic transducer 1 is also used to transmit and receive ultrasonic waves so as to detect obstacles behind the motor vehicle, which may collide with the motor vehicle when the motor vehicle moves backward. The ultrasonic system of FIG. 1 is arranged to be supplied with electrical power from a power source 306, such as a vehicle-mounted battery. A manual switch 3 is provided to select one of the rear and front transducers 1 and 2 for the communication circuit 200.

The obstacle detecting circuit 100 comprises an obstacle detector 7 and an alarm 8 responsive to the obstacle detector 7 for informing the vehicle driver or occupant that a detected obstacle is within a dangerous range. The obstacle detecting circuit 100 per se may be a conventional circuit including an ultrasonic generator or transmitter and an ultrasonic detector or receiver. The obstacle detecting circuit 100 is supplied with power via the switching circuit 300 from the power source 306. The switching circuit 300 comprises a reverse gear switch 302 arranged to be closed when the transmission (not shown) of the motor vehicle is in reverse gear position, a brake switch 303 arranged to be closed when the brake pedal (not shown) of the motor vehicle is depressed, a pair of diodes 304 and 305 respectively connected to the reverse gear switch 302 and the brake switch 303, and a relay 301 operated by a hookswitch 307. This hookswitch 307 is associated with a handset 211 of the communication circuit so as to detect whether the handset 211 is positioned at a predetermined resting position or not.

The switching circuit 300 operates such that electric power is fed to the obstacle detecting circuit 100 only when the handset 211 is not used for communication, under the condition that the reverse gear switch 302 or brake switch 303 is in the on state.

The communication circuit 200 comprises an ultrasonic receiver 4, an ultrasonic transmitter 5, an ultrasonic call signal responding circuit 6, the above-mentioned handset 211, and a relay switch 210. The handset 211 having a speaker and a microphone therein is arranged to be positioned at an unshown rest in which the hookswitch 307 is built in. When the handset 211 is unused, namely, when the handset 211 is positioned at the rest, the hookswitch 307 is closed so as to close the relay 301. Furthermore, the hookswitch 307 produces a high level output signal when the handset 211 is positioned at the rest, which high level signal is fed to the call signal responding circuit 6. Under this condition, if the transmission gear is set at the reverse gear position or the brake pedal is depressed, the reverse gear switch 302 or the brake pedal switch 303 is closed. As a result, the obstacle detecting circuit 100 is energized to detect obstacles behind the vehicle. On the other hand, the communication circuit 200 is continuously supplied with power from the power source 306 so that it is operable all the time.

The structure of the embodiment of FIG. 1 and operation of the same will be further described in detail with reference to FIGS. 2–4.

Figure 2:
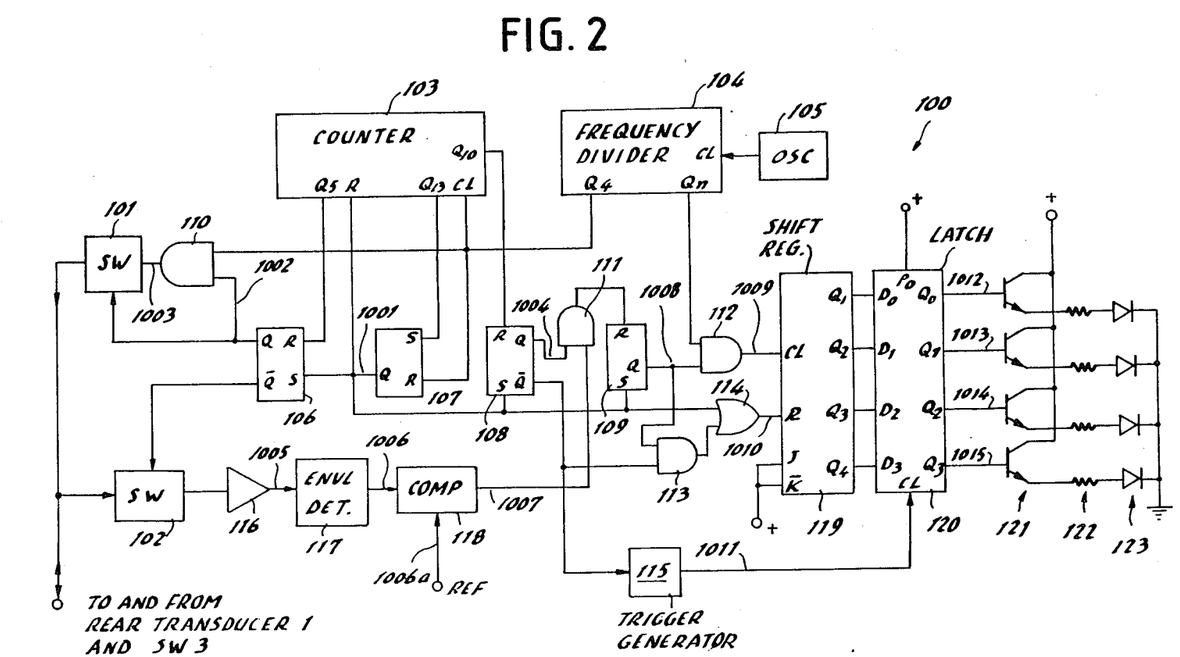
FIG. 2 is a circuit diagram of the obstacle detecting circuit of FIG. 1.

FIG. 2 is a circuit diagram of the obstacle detecting circuit 100. The obstacle detecting circuit 7 comprises a first analog switch 101 arranged to be closed when transmitting ultrasonic waves, a second analog switch 102 arranged to be closed when receiving ultrasonic waves, an oscillator 105 for generating an oscillation signal of 600 KHz, a frequency divider 104, such as CD4040 manufactured by RCA, responsive to the oscillating signal from the oscillator 105 for producing an ultrasonic wave signal of 37.5 KHz and a timing signal, a counter 103, such as CD4040 manufactured by RCA, for generating a plurality of timing pulse signals in response to the ultrasonic wave signal from the frequency divider 104, flip-flops 106, 107, 108 and 109, such as CD4013 manufactured by RCA, AND gates 110, 111, 112 and 113, an OR gate 114, a trigger signal generator 115, an amplifier 116, a detector 117, and a comparator 118. References Q4, Qn used for indicating output terminals of the frequency divider 104 and Q5, Q10 and Q13 used for indicating output terminals of the counter 103 respectively mean that the frequency of the signal derived therefrom equals 1/m of the input signal frequency wherein "m" equals $2^4$ for Q4, $2^{10}$ for Q10 and so on.

The alarm 8 comprises a shift register 119, such as CD4035 manufactured by RCA, a latch 120, such as CD4042 manufactured by RCA, a set of npn transistors 121, a set of resistors 122, and a set of light-emitting diodes (LEDs) 123.

Figure 3:
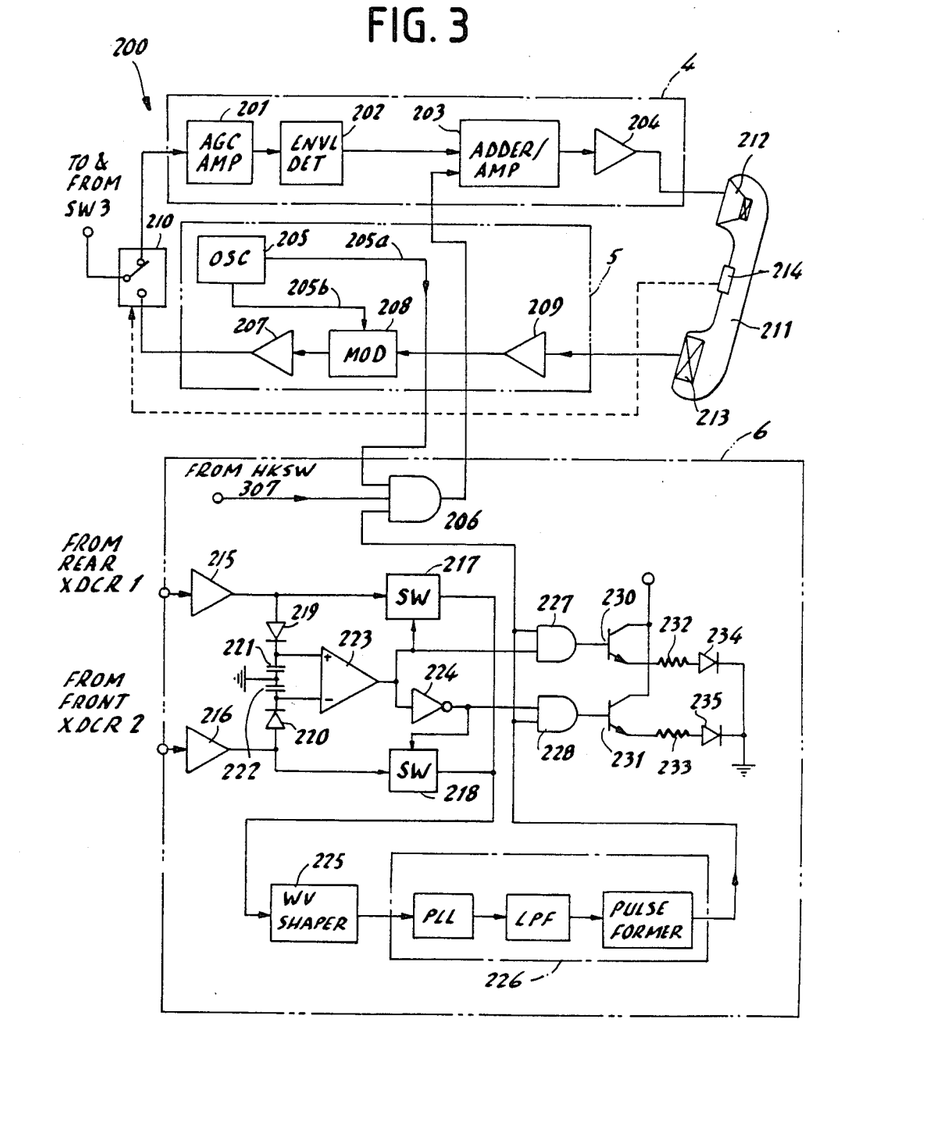
FIG. 3 is a circuit diagram of the communication circuit of FIG. 1.
Figure 4:
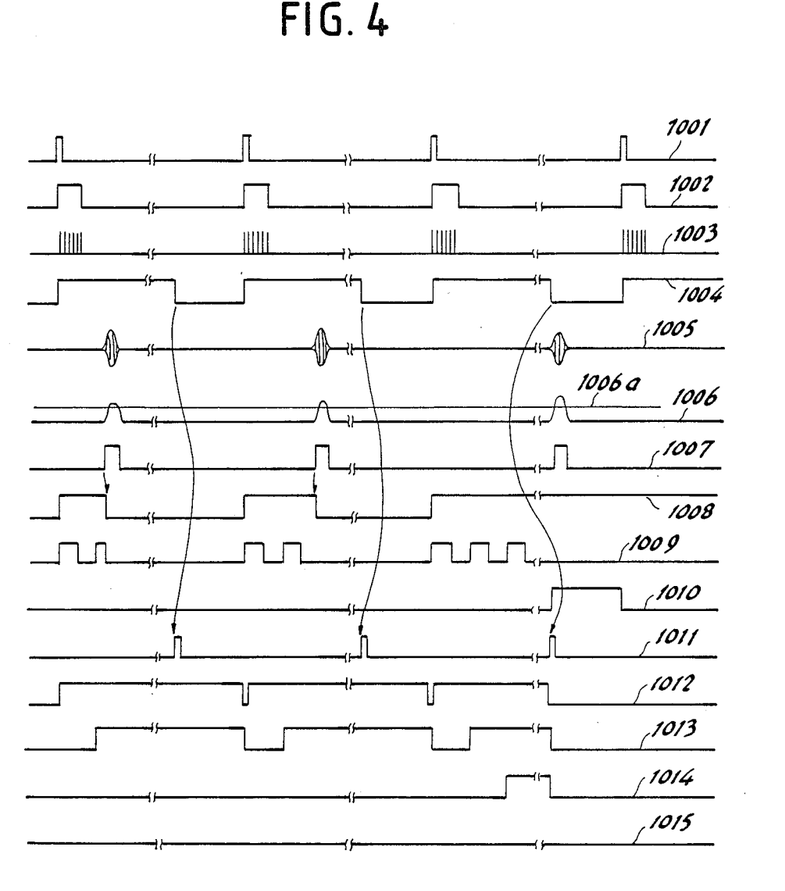
FIG. 4 is a timing chart useful for understanding the operation of the obstacle detecting circuit of FIG. 2.

FIG. 3 illustrates a circuit diagram of the communication circuit 200. The receiver 4 comprises an automatic-gain-controlled (AGC) amplifier 201, an envelope detector 202, an adder-amplifier 203, and an audio amplifier 205. The AGC amplifier 201 is responsive to an incoming signal which is fed from the rear or front ultrasonic transducer 1 or 2 via the manual switch 3 of FIG. 1 and a relay switch 210 controlled by a push-button switch 214 attached to the handset 211. An output signal from the audio amplifier 204 is connected to a speaker 212 of the handset 211 so as to emit sound or vocal messages transmitted from another vehicle.

The transmitter 5 comprises a preamplifier 209 responsive to an audio signal from a microphone 213 built in the handset 211, an oscillator circuit 205, an amplitude modulator 208, and a power amplifier 207. The oscillator circuit 205 comprises an oscillator and a frequency divider responsive to the oscillation signal from the oscillator so as to produce two oscillation signals 205a and 205b. The oscillation signal 205a is an audio signal, such as 2 KHz, while the other oscillation signal 205b, which will be used as a carrier wave, is of an ultrasonic frequency, such as 37.5 KHz. It is to be noted that the ultrasonic signal 205 from the oscillator circuit has the same frequency as that of the ultrasonic signal fed from the obstacle detecting circuit 100 of FIG. 2. With this arrangement the carrier wave 205b from the oscillator circuit 205 is amplitude modulated by the modulator 208 and a modulated signal is transmitted from one of the rear and front ultrasonic transducers 1 and 2 after being amplified by the power amplifier 207 and transmitted via the relay switch 210 and the manual switch 3.

The call signal responding circuit 6, which is directly connected to the rear and front transducers 1 and 2 as shown in FIG. 1, comprises a pair of amplifiers 215 and 216, a pair of peak detectors each having a diode 219 or 220 and a capacitor 221 or 222, an operational amplifier 223 responsive to output signals from the peak detectors for comparison therebetween, an inverter 224, a pair of analog switches 217 and 218 controlled by the output signal from the operational amplifier 223, a pulse shaping circuit 225 responsive to the output signals from the analog switches 217 and 218, a frequency determination circuit 226 for detecting whether the frequency of the incoming signal is within a predetermined frequency range, two AND gates 227 and 228, two transistors 230 and 231, two resistors 232 and 233, two LEDs 234 and 235, and an AND gate 206. The frequency determination circuit 226 comprises a phase-locked-loop (PLL) using an IC, such as CD4046 manufactured by RCA, and a lock detection circuit having a low pass filter and a pulse forming circuit responsive to an output signal from the low pass filter. Such an arrangement of the combination of a PLL circuit and a lock detection circuit is shown on page 326 of RCA COS/MOS DIGITAL INTEGRATED CIRCUIT published in 1973. In order to detect whether the frequency of the incoming signal lies within a predetermined bandwidth, the bandwidth of a VCO included in the PLL is set up for an appropriate minimum frequency $f_{min}$, such as 30 KHz, and for an appropriate maximum frequency $f_{max}$, such as 50 KHz.

The amplifiers 215 and 216 are respectively responsive to incoming signals from the rear and front transducers 1 and 2, and the peak values of the output signals from these amplifiers 215 and 216 are respectively detected by the pair of peak detectors. When the peak value of the signal from the amplifier 215 is greater than the signal from the other amplifier 216, the analog switch 217 is closed to transmit the signal from the amplifier 215 to the pulse shaping circuit 225. On the other hand, when the peak value of the signal from the amplifier 216 is higher than the other, the analog switch 218 is closed. The pulse waveform shaping circuit 225 is responsive to output signals from the analog switches 217 and 218, and the waveform shaped pulse train is fed to the frequency determination circuit 226 which produces a high level output signal when the frequency of the incoming signal is within a predetermined frequency range. The output signal from the frequency determination circuit 226 is fed to AND gates 227 and 228 which are also responsive to the output signal from the operational amplifier 223 and the output signal from the inverter 224 respectively, and to the AND gate 206. The LEDs 234 and 235 are respectively driven by the transistors 230 and 231 which are respectively controlled by the output signals from the AND gates 227 and 228. The AND gate 206 is also responsive to an oscillation signal 205a of an audio frequency, such as 2 KHz, generated by the oscillator 205 of the transmitter circuit 5, and to the high level signal from the hookswitch 307. The output signal from the AND gate 206 is fed to the adder-amplifier 203 so that the audio signal 205a will be emitted from the speaker 212 when the AND gate 206 is in receipt of a high level signal from the frequency determination ciruccuit 226 and another high level signal from the hookswitch 307..

Turning back to FIG. 2, the operation of the obstacle detecting circuit 100 will be described with reference to a timing chart of FIG. 4. The oscillation signal of 600 KHz from the oscillator 105 is frequency divided by the frequency divider 104 to produce an output signal of 37.5 KHz at an output terminal Q4. This 37.5 KHz oscillation signal is fed to a clock input terminal CL of the counter 103, to the AND gate 110 and to a reset terminal R of the flip-flop 108. The counter 103 produces three different output signals at its output terminals Q5, Q10 and Q13 by counting the number of pulses fed to its clock input terminal CL. Assuming that the output signal level at the output terminal Q13 goes high, this high level signal is fed to a set terminal S of the flip-flop 107. As a result, the flip-flop 107 produces a high level output signal 1001 at its output terminal Q, which signal 1001 is fed to set terminals S of remaining flip-flops 106, 108 and 109 for causing them to be set. The flip-flop 107 is reset on receipt of a pulse from the output terminal Q4 of the frequency divider 104 so as to produce a narrow pulse 1001 shown in FIG. 4. The output pulse 1001 from the flip-flop 107 is also fed to a reset terminal R of the counter 103 for resetting the same to zero. Then the counter 103 again starts counting the number of clock pulses, and produces a high level output signal at its output terminal Q5 after a predetermined period of time has elapsed. This output signal from the output terminal Q5 is fed to a reset terminal R of the flip-flop 106. Therefore an output pulse signal 1002 and its inverted signal are obtained at output terminals Q and $\overline{Q}$ of the flip-flop 106. The output signal 1002 from the output terminal Q of the flip-flop 106 is fed to another input terminal of the AND gate 110 and to the analog switch 101 to close the same. Since the AND gate 110 receives the 37.5 KHz signal from the frequency divider 104, this 37.5 KHz signal is gated to produce a transmitting signal 1003 which is fed through the analog switch 101 to the rear transducer 1 of FIG. 1. Therefore, a pulse-like ultrasonic wave is emitted from the rear transducer 1 toward a detecting zone at the rear of the motor vehicle.

When transmission is completed, the other analog switch 102 is closed by the output signal from the output terminal $\overline{Q}$ of the flip-flop 106 so as to return to the receiving state. In other words, the low level duration of the signal 1002 corresponds to receiving duration, while the high level duration is the transmitting duration. Assuming there are one or more obstacles behind the motor vehicle, ultrasonic waves reflected from the obstacles are received by the rear transducer 1 as an echo signal. This echo signal is fed via the closed analog switch 102 to the amplifier 116 to be amplified therein. An amplified echo signal 1005 is then envelope detected by the envelope detector 117 (see the signal waveform 1006 of FIG. 4) and the amplitude of the envelope signal 1006 is compared with a reference voltage 1006a by the comparator 118. When the amplitude of the envelope signal 1006 is greater than the reference voltage 1006a, the comparator 118 produces a high level output pulse 1007 which is fed to the AND gate 111.

The flip-flop 108 is arranged to be periodically reset to zero by an output signal from the output terminal Q10 of the counter 103 so that a pulse signal 1004 having a predetermined width is developed at its output terminal Q. The width of the pulse signal 1004 from the output terminal Q of the flip-flop 108 represents the maximum distance of the detecting zone from the motor vehicle. The AND gate 111 is controlled by the pulse signal 1004 such that the high level pulse signal 1007 from the comparator 118 is fed to a reset terminal R of the flop-flop 109 only when the high level pulse signal 1004 is present. Namely, the pulse signal 1007 from the comparator 118, which pulse signal 1007 represents the detection of an echo signal, is fed to the flip-flop 109 only when the corresponding obstacle is within a predetermined distance. The flip-flop 109 is thus reset to zero, obtaining a pulse signal 1008 at its output terminal Q. This pulse signal 1008 is fed to an input terminal of the AND gate 112 which also receives an output signal from an output terminal Qn of the frequency divider 104. This output terminal Qn may be Q10 from which an oscillation signal of lower frequency than that from the output terminal Q4 is obtained. Therefore, one or more pulses from the output terminal Qn is fed to a clock terminal CL of the shift register 119 as shown by the waveform 1009, as long as the level of the output signal from the flip-flop 109 is high. The shift register 119 has input terminals J and $\overline{K}$ both receiving a high level signal from a voltage source (+), and is arranged to shift the high level signal in response to a pulse applied to the clock terminal CL. The shift register 119 has four stages, and has four output terminals Q1 through Q4. Therefore, when a first pulse of the signal 1009 is applied to the clock terminal CL, the output signal level at the output terminal Q1 goes high. When a second pulse is applied, the output signal level at the second output terminal Q2 goes high. Assuming that two pulses are applied to the clock input terminal CL of the shift register 119 as shown in FIG. 4, the output signal levels at the output terminals Q1, Q2, Q3 and Q4 are "1" "1" "0" "0" as shown by waveforms 1012,, 1013, 1014 and 1015. This output signal state is written into the latch 120 in synchronism with a trigger signal 1011 produced by the trigger signal generating circuit 115 in response to the rising or leading edge of an output signal from an output terminal $\overline{Q}$ of the flip-flop 108.

The set of transistors 121 is responsive to the output signal state of the latch 120 so as to energize a appropriate number of the LEDs 123 in accordance with the contents of the latch 120. In the case of the above example, therefore, only two LEDs 123 are energized to visually display the distance between the motor vehicle and the detected obstacle, alerting the vehicle driver.

If no obstacle is detected within the predetermined distance, namely, no echo signal is received within the predetermined time length defined by the width of the pulse signal 1004 from the flip-flop 108, a pulse signal 1010 is produced at an output terminal of the OR gate 114, responsive to the output signal from the AND gate 113 and to the output signal 1001 from the flip-flop 107. This pulse signal 1010 is fed to a reset terminal R of the shift register 119 to clear the contents thereof. Thus, the data of the shift register 119 is written into the latch 120 to deenergize the LEDs 123.

Figure 5:
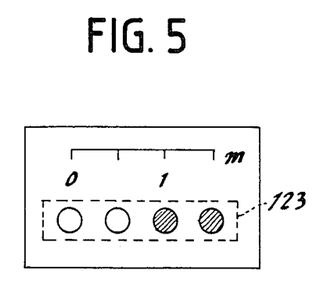
FIG. 5 is a schematic view of a visual display associated with the obstacle detecting circuit of FIG. 2.

In this way, the obstacle detecting circuit of FIG. 2 periodically detects possible obstacles behind the motor vehicle to alert the motor vehicle driver if necessary. FIG. 5 illustrates a display panel including the LEDs 123 which are arranged in line. The display panel has a distance scale showing the relationship between the distance and the LEDs 123. In the illustrated example, a state in which two LEDs 123 are lighted indicates 1 meter. This display panel may be mounted at the front portion within the vehicle compartment so that the vehicle driver may readily watch it when driving the vehicle backward. In this way, the vehicle driver is capable of being advised of the distance by the number of energized LEDs 123. Accordingly, the driver may depress the brake pedal to stop the backing vehicle or terminate backward movement by changing the gear position so as to prevent undesirable collision with detected obstacles.

The communication system of FIG. 3 operates as follows. First of all, the operation of the call signal responding circuit 6 will be described. Since the amplifiers 215 and 216 are directly connected to the rear and front transducers 1 and 2 respectively, any received signals are amplified by these amplifiers 215 and 216. The peak value of the output signal from the amplifiers 215 and 216 are respectively detected by the pair of peak detectors, and the peak value which is greater than the other is determined by the operational amplifier 223. Suppose that the amplitude of the received ultrasonic signal by the rear transducer 1 is greater than that received from the front transducer 2, the output signal level from the operational amplifier 223 turns high causing the analog switch 217 to be closed, while the other analog switch 218 remains open. As a result, the amplified incoming signal from the amplifier 215 is fed via the analog switch 217 to the pulse waveform shaping circuit 218 in which a pulse signal is produced. This pulse signal is fed to the frequency determination circuit 226 so as to determine whether the frequency of the incoming signal is within a predetermined frequency range, such as ranging from 30 to 50 KHz. If yes, the frequency determination circuit 226 produces a high level output signal which opens the AND gate 206 to send the audio signal, such as 2 KHz signal, 205*b* from the oscillator 205 to the adder-amplifier 203. As a result, a call sound of 2 KHz is emitted from the speaker 212 of the handset 211. At this time the output signal of the AND gate 227 turns high rendering the following transistor 230 conductive. Therefore, the LED 234 is energized, informing the vehicle driver that a motor vehicle behind is calling. On the other hand, when the amplitude of the signal from a motor vehicle ahead is greater than that from the motor vehicle behind, the other LED 235 is energized while the same call sound of 2 KHz is emitted from the speaker 212.

As described in the above, the AND gate 206 is closed to transmit the 2 KHz audio signal 205*a* only when high level signals are fed from the frequency determination circuit 226 and from the hookswitch 307. Therefore, when the handset 211 is lifted up, the hookswitch 307 is opened to send a low level signal to the AND gate 206. As a result, the audio signal 205*a* is not sent to the adder-amplifier 203 anymore, terminating emission of the call signal from the speaker 212. From the above, it will be understood that the display by way of the LED 234 or 235 for indicating that a vehicle ahead or behind is calling, is effected irrespective of the state of the handset 211 so that one of the LEDs 234 and 235 emits light continuously even after the the handset 211 is lifted up to speak and hear. On the other hand, the 2 KHz call signal is emitted from the speaker 212 until the handset 211 is lifted up.

In order to transmit a vocal messege to passengers of the front or rear vehicle, the push-button switch 214 built into the handset 211 is first depressed so that the relay switch 210 is changed from receiver mode to transmitter mode. At this time the manual switch 3 is manipulated to select one of the rear and front transducers 1 and 2. Namely, when it is intended to communicate with a rear vehicle, the manual switch 3 is changed over to connect the communication circuit 200 to the rear transducer 1. Then the driver or other vehicle occupant speaks into the microphone 213, so that the audio signal is amplified by the preamplifier 209, and the output signal from the preamplifier 209 amplitude modulates the carrier signal 205*b* from the oscillator circuit 205 in the amplitude modulator 208. The amplitude modulated signal is then amplified by the power amplifier 207 to be fed via the relay switch 210 and the manual switch 3 to the rear transducer 1.

When it is intended to receive incoming signals, the push-button switch 214 is released so that the receiver 4 receives the incoming signal from the rear transducer 1 via the relay switch 210. Under this condition, if the manual switch 3 is changed over to establish connection between the front transducer 2 and the relay switch 210, the receiver 4 receives an incoming signal received by the front transducer 2. The incoming signal is amplified by the AGC amplifier 210, and is then envelope detected to derive only the audio signal included in the incoming signal. This audio signal is amplified by the adder/amplifier 203 and the audio amplifier 204 to drive the speaker 212. Thus a vocal message sent from an occupant of the front or rear vehicle is emitted from the speaker 212.

The above-described obstacle detecting circuit 100 and the communication circuit 200 are used as follows. As described with reference to FIG. 1, the obstacle detecting circuit 100 is energized only when the relay switch 301 is in the on state under the condition that one of the switches 302 and 303 is also in the on state. Namely, the handset 211 used in the communication circuit 200 should be located in its rest to turn on the hookswitch 307 in order that the obstacle detecting circuit 100 is operable. Furthermore, the brake pedal should be depressed or the transmission should be set to reverse gear position. In other words, when the motor vehicle is moving forward or the communcation circuit 200 is used, the obstacle detecting circuit 100 is inoperable.

Namely, when the handset 211 is lifted up from its rest to communicate with another vehicle, the obstacle detecting circuit 100 is put in an inoperable condition, and therefore, only the communication circuit 200 is operable thereafter. Thus, the communcation circuit 200 is operating all the time for receiving 37.5 KHz carrier waves from other vehicles. The 37.5 KHz carrier wave signal is used as a call signal as will be described later. When the obstacle detecting circuit 100 is operating, and when a reflected echo signal is received and transmitted to the frequency determination circuit 226 via the amplifier 215 and the analog switch 217, the frequency determination circuit 226 does not respond to the echo signal inasmuch as the echo signal has a relatively short time length compared to the carrier wave used for vocal messege transmission. Namely, the time constant of a C-R circuit forming the low pass filter of the lock detector included in the frequency determination circuit 226 is designed so that the number of continuous pulses is relatively small (see the waveform 1003 of FIG. 4). As a result, the frequency determination circuit 226 does not produce a false call signal. In other words, the call signal responding circuit 6 of the communication circuit 200 does not malfunction in response to the ultrasonic echo signal. Therefore, the rear transducer 1 can be used in common between the obstacle detecting circuit 100 and the communication circuit 200 without suffering any problems.

In the above embodiment, only a single ultrasonic transducer is employed at the rear of the motor vehicle. However, the number of transducers and corresponding detecting circuits may be increased so as to detect obstacles in a plurality of zones at the rear of the vehicle.

Figure 6:
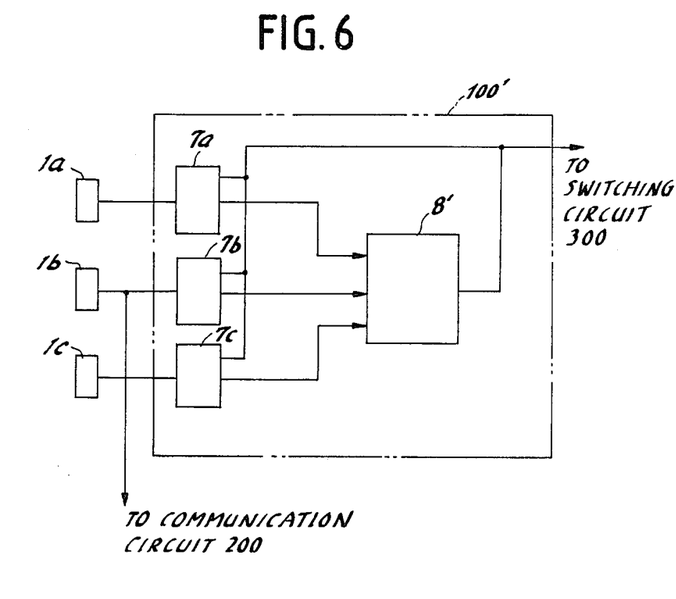
FIG. 6 is a schematic block diagram showing a modification of the embodiment of FIG. 1.

Hense, reference is now made to FIG. 6 showing a modification of the above embodiment. The circuitry of FIG. 6 differs from FIG. 1 in that three rear ultrasonic transducers 1a, 1b and 1c are employed, and three obstacle detecting circuits 7a, 7b and 7c, and three alarming devices 8' are also employed. In other words, three obstacle detecting circuits 100 of FIG. 2 are used so as to emit and receive ultrasonic waves through the three transducers 1a, 1b and 1c respectively. These three transducers 1a, 1b and 1c may be arranged at the rear of the vehicle to cover right, center and left zones respectively. One of these three transducers, for instance, the transducer 1b positioned at the middle to cover the center zone, is connected via the manual switch 3 of FIG. 1 to the communication circuit 200.

Figure 7:
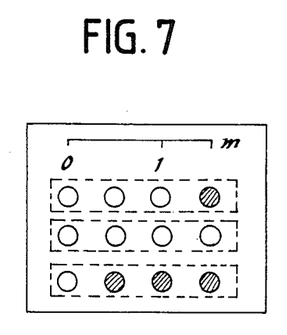
FIG. 7 is a schematic view of a visual display associated with the obstacle detecting circuit of FIG. 6.

The alarming devices 8' may be three sets of LED arrays as shown in FIG. 7. With the provision of a plurality of obstacle detecting circuits as shown in FIG. 6, the position of obstacles can be more accurately ascertained. According to an example of FIG. 7, it can be ascertained that obstacles are located at the right and left sides, and the left side obstacles are closer to the vehicle than the right side obstacles. By using visually displayed locations for detected obstacles, the vehicle driver may swing the steering wheel to prevent collision from obstacles when the vehicle moves backward.

In the case that one of the left, center and right zones, respectively covered by the transducers 1a, 1b and 1c, partially overlap with an adjacent zone or zones, echo signals originally emitted from a given transducer are also received by one or two other transducers resulting in false detection. In order to avoid such malfunctions, the obstacle detecting circuits 7a, 7b and 7c may be operated in a time division manner so that ultrasonic waves emitted from a given transducer are received by only this given transducer.

In the above-described embodiment and its modification, although each ultrasonic transducer is used for both emitting and receiving ultrasonic waves, a pair of transducers may be used in place of each so that one is used for only transmission and the other is used for only reception.

The above-described embodiments are just examples of the present invention, and therefore, it will be apparent for those skilled in the art that many modifications and variations may be made without departing from the spirit of the present invention.

What is claimed is:

1. An ultrasonic detection and communication system for a motor vehicle, comprising:
    a rear ultrasonic transducer adapted to be mounted at the rear of said motor vehicle;
    a front ultrasonic transducer adapted to be mounted at the front of said motor vehicle;
    obstacle detecting circuit means for causing said rear ultrasonic transducer to emit an ultrasonic wave and for detecting echo signals received by said rear ultrasonic transducer so as to alert a vehicle occupant when said echo signals indicate that one or more obstacles is within a predetermined range;
    a communication circuit including an ultrasonic receiver with an associated speaker, and an ultrasonic transmitter with an associated microphone, said transmitter and said receiver being connectable to said rear and front ultrasonic transducers; and
    switching means for causing said obstacle detecting circuit means to operate only when said receiver and said transmitter are unused.

2. A system as claimed in claim 1, wherein said speaker and said microphone are mounted in a handset which can be set at a predetermined position when it is not in use, and wherein said switching means includes means for detecting whether said handset is located at said predetermined position.

3. A system as claimed in claim 2, wherein said switching means comprises a hookswitch associated with a rest for said handset.

4. A system as claimed in claim 1, further including means for detecting an operating condition of said motor vehicle so that said detecting means causes said obstacle detecting circuit means to operate only when said vehicle is in a predetermined operating condition.

5. A system as claimed in claim 4, wherein said operating condition detecting means comprises a first switch arranged to be closed when a brake pedal of said vehicle is depressed, and a second switch arranged to be closed when the transmission of said vehicle is in reverse gear position.

6. A system as claimed in claim 1, wherein said switching means is interposed between a power source and a power supply line of said obstacle detecting circuit.

7. A system as claimed in claim 6, wherein said switching means includes:
    a relay switch controlled by a hookswitch associated with a rest of a handset in which said speaker and said microphone are mounted;
    a first switch arranged to be closed when a brake pedal of said vehicle is depressed; and a second switch arranged to be closed when the transmission of said vehicle is in reverse gear position, said first and second switches being connected to said relay switch in series.

8. A system as claimed in claim 1, further including a receiver-transmitter changeover means for selectively connecting one of said receiver and said transmitter to one of said rear and front ultrasonic transducers.

9. A system as claimed in claim 8, wherein the receiver-tranmitter changeover means comprises a push-button switch attached to a handset in which said speaker and microphone are mounted, and a relay switch controlled by said push-button switch.

10. A system as claimed in claim 8, further including a manual switch for selectively connecting one of said rear and front ultrasonic transducers to said receiver-transmitter changeover means.

11. A system as claimed in claim 1, further including:
a call signal responding circuit connected to said rear and front ultrasonic transducers, said call signal responding circuit having means for determining whether the frequency of an incoming signal lies within a predetermined frequency range; and
means for supplying said speaker with an audio signal when said frequency of said incoming signal is within said predetermined frequency range.

12. A system as claimed in claim 11, wherein said call signal responding circuit includes:
means for determining whether the amplitude of an incoming signal from said rear ultrasonic transducer is greater or smaller than the amplitude of another incoming signal from said front ultrasonic transducer; and
display means responsive to the amplitude determining means and to the frequency determining means for informing a vehicle occupant of a call from either a vehicle ahead or a vehicle behind.

13. A system as claimed in claim 11, wherein said frequency determining means includes:
a phase-locked-loop;
a low pass filter responsive to an output signal from said phase-locked-loop; and
a pulse former responsive to an output signal from said low pass filter.

14. A system as claimed in claim 1, further comprising a plurality of additional rear ultrasonic transducers, and associated obstacle detecting circuits, each obstacle detecting circuit having a visual display which shows the distance between said vehicle and detected obstacles.

* * * * *